United States Patent [19]

Bard et al.

[11] Patent Number: 4,758,540
[45] Date of Patent: Jul. 19, 1988

[54] METHOD FOR THE PRODUCTION OF PENCIL LEADS AND PENCIL LEADS PRODUCED BY THE METHOD

[75] Inventors: Martin Bard, Amberg; Hans-Georg Baumgart, Schwarzenfeld, both of Fed. Rep. of Germany

[73] Assignee: Buchtal GmbH, Fed. Rep. of Germany

[21] Appl. No.: 92,447

[22] Filed: Sep. 3, 1987

[30] Foreign Application Priority Data

Apr. 9, 1986 [DE] Fed. Rep. of Germany ....... 3630201

[51] Int. Cl.$^4$ .................. C03C 3/89; C03C 3/108; C04B 35/14; C04B 35/52
[52] U.S. Cl. ........................ 501/99; 501/17; 501/22; 501/133; 106/19
[58] Field of Search ............. 106/19; 501/17, 22, 501/61, 65, 99, 133, 154

[56] References Cited

U.S. PATENT DOCUMENTS 3,732,115 5/1973 Lankard et al. ................. 106/19

FOREIGN PATENT DOCUMENTS 57-209848 12/1982 Japan ............................ 106/19

Primary Examiner—William R. Dixon, Jr.
Assistant Examiner—David M. Brunsman
Attorney, Agent, or Firm—Reese Taylor

[57] ABSTRACT

The invention is concerned with the production of pencil leads and also pencil leads as produced by the proposed method. In accordance with the invention, graphite, enamel frit and quartz flour, preferably at least approximately in a ratio of one part of graphite, two to four parts of enamel frit and one part of quartz flour, are processed to form a starting mixture which is then pressed into the form of a lead, is dried and is fired. The invention renders it possible to perform sintering below a temperature of 550° C. and, accordingly, to perform the sintering firing operation in a normal oxidizing atmosphere.

11 Claims, 1 Drawing Sheet

METHOD FOR THE PRODUCTION OF PENCIL LEADS AND PENCIL LEADS PRODUCED BY THE METHOD

RELATED PATENT APPLICATIONS

None.

BACKGROUND OF THE INVENTION

This invention relates to the production of pencil leads. More particularly, this invention relates to a new and useful method for the production of pencil leads and the pencil leads produced thereby.

DESCRIPTION OF THE PRIOR ART

Pencil leads are generally produced from a mixture of graphite and clay. The hardness of the pencil lead is determined by the ratio of graphite and clay selected for this mixture. The mixture is pressed to form a lead, which is then dried and fired at temperatures of 1000° to 1100° C. This method is, however, only able to be performed if, for the firing of the pressed and dried leads, there is an inert atmosphere in the kiln, the absence of oxygen in the atmosphere meaning that combustion of the graphite is not possible at the firing temperature. For producing and maintaining such an inert atmosphere, comparitively elaborate equipment on and in the kiln is needed. This requirement, in conjunction with the high firing temperatures due to the high sintering temperature of the clay, leads to a substantial increase in the costs of production.

Accordingly, one object of the present invention is to provide a method for the production of pencil leads making it possible to reduce the firing temperature to a substantially lower value and thus make a corresponding saving in the costs of firing.

SUMMARY OF THE INVENTION

This object is achieved in accordance with the invention inasfar as in a method for the production of pencil leads, in which a mixture of graphite and an inorganic sintering material is pressed to form a pencil lead, is dried and is fired, the sinterable material being comprised of a mixture of an enamel frit and quartz flour. The preferred mixing ratio of the elements is at least approximately one part of graphite, two to four parts of enamel frit and one part of quartz flour.

DESCRIPTION OF THE PREFERRED EMBODIMENT

Figure 1:
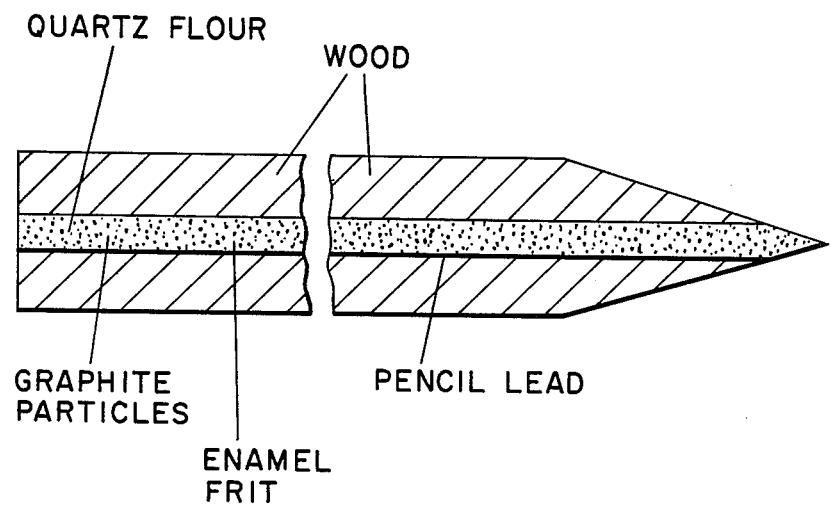
FIG. 1 is a diagram which shows a typical pencil embodying a pencil lead according to the concepts of the present invention.

A pencil lead, as shown in FIG. 1, is produced by the method of the invention wherein a mixture of graphite and an inorganic sintering material is pressed into the form of a pencil lead, and then is dried and fired. The inorganic sintering material comprises a mixture of an enamel frit and quartz flour. The mixing ratio of the composition is preferably approximately one part of graphite, two to four parts of enamel frit and one part of quartz flour.

The term enamel frit is used in the sense of a prefritted composition which is only partly vitrified. It is preferred that it be frit on a lead monooxide (PbO)—boron oxide ($B_2O_3$)—silicate base. The composition used in the invention is also able to be pressed, dried and fired and, given the selection of a suitable frit, offers the possibility of sintering the pencil leads at a temperature as low as one under 550° C. The term quartz flour is used in the sense of a fine quartz with a preferred fineness of not more than 25 micrometers.

Thus, in accordance with a further development of the invention, it is possible, by adjusting the enamel frit and/or by a suitable selection of the frit, to keep the sintering temperature down to a value of under 550° C. This, in connection with further features of the invention, makes it possible to dispense with an inert gas atmosphere during firing so that firing takes place in a normal, oxidizing atmosphere. It has turned out that although pure graphite burns at a temperature as low as a value somewhat higher than 490° C., in the case of the proposed composition, such combustion does not occur even at a temperature just under 550° C. This temperature is, however, the temperature at which sintering takes place; that is, a temperature at which there is sufficient solidification of the composition.

As a basic principle, the ratio of components in the mixture, as already noted, is at least approximately equal to one part of graphite, two to four parts of enamel frit and one part of quartz flour. By varying this ratio within the given limits and by a suitable selection of the enamel frit employed, it is on the one hand possible to set the firing temperature to the desired lower value, and on the other hand it is possible, however, to set the hardness of the pencil leads produced. With an increase in the fraction of frit, there is an increase in the hardness or degree of hardness of the pencil lead. This adjustment is simple to undertake. Preferably, the procedure is such that the adjustment of the fraction of frit to be used is undertaken by measuring the ohmic resistance of the material of the pencil leads. This is possible because the electrical resistance increases with an increasing hardness of the lead in a reproducible manner owing to the physical properties of the composition of the invention.

What is claimed is:

1. A method for the production of pencil leads in which a mixture of graphite and an inorganic, sinterable material is pressed to form the pencil lead, is dried and is fired, characterized in that the sinterable material comprises a mixture of enamel frit and quartz flour in which the mixing ratio of all the components is at least approximately one part of graphite, two to four parts of enamel frit and one part of quartz flour.

2. A method as in claim 1 wherein the lead's hardness is adjusted by varying the fraction of the enamel frit whereby an increase in hardness is obtained by increasing the fraction of the enamel frit.

3. The method as in claim 2 wherein said adjustment with an increasing fraction of enamel frit is undertaken by measuring the ohmic resistance, which increases with an increase in this fraction, of the lead material.

4. The method as in claim 1 wherein the fraction of enamel frit is so set or the enamel frit is so selected that sintering takes place under 550° C.

5. The method as in claim 4 wherein the lead's hardness is adjusted by varying the fraction of the enamel frit whereby an increase in hardness is obtained by increasing the fraction of the enamel frit.

6. The method as in claim 5 wherein said adjustment with an increasing fraction of enamel frit is undertaken by measuring the ohmic resistance, which increases with an increase in this fraction, of the lead material.

7. The method as in claim 1 wherein the sintering operation is carried out in an oxidizing atmosphere.

8. The method as in claim 7 wherein the lead's hardness is adjusted by varying the fraction of the enamel frit whereby an increase in hardness is obtained by increasing the fraction of the enamel frit.

9. The method as in claim 8 wherein said adjustment with an increasing fraction of enamel frit is undertaken by measuring the ohmic resistance, which increases with an increase in this fraction, of the lead material.

10. A pencil lead mixture comprising:
(a) about one part graphite;
(b) from about two parts to about four parts enamel frit; and
(c) about one part quartz flour;
  (1) the pencil lead being prepared by pressing, drying and firing the mixture of graphite, enamel frit and quartz flour.

11. A pencil lead comprising:
(a) graphite; and
(b) inorganic sinterable material;
  (1) wherein said sinterable material comprises a mixture of an enamel frit and quartz flour in an amount of about two parts to about four parts enamel frit and about one part of quartz flour to every one part of graphite.

* * * * *